(12) United States Patent
Ekwuribe et al.

(10) Patent No.: US 6,815,530 B2
(45) Date of Patent: Nov. 9, 2004

(54) SUBSTANTIALLY MONODISPERSED MIXTURES OF POLYMERS HAVING POLYETHYLENE GLYCOL MOIETIES

(75) Inventors: Nnochiri N. Ekwuribe, Cary, NC (US); Christopher H. Price, Chapel Hill, NC (US); Aslam M. Ansari, Rockville, MD (US); Amy L. Odenbaugh, Morrisville, NC (US)

(73) Assignee: Nobex Corporation, Durham, NC (US)

( * ) Notice: Subject to any disclaimer, the term of this patent is extended or adjusted under 35 U.S.C. 154(b) by 0 days.

(21) Appl. No.: 10/367,047

(22) Filed: Feb. 14, 2003

(65) Prior Publication Data

US 2003/0144468 A1 Jul. 31, 2003

Related U.S. Application Data

(63) Continuation of application No. 09/873,731, filed on Jun. 4, 2001.

(51) Int. Cl.[7] .............................................. C08G 65/34
(52) U.S. Cl. ....................... 528/425; 528/373; 528/391; 528/396; 568/613; 568/622; 524/155; 524/167
(58) Field of Search ................................ 528/425, 373, 528/391, 396; 568/613, 622; 524/155, 167

(56) References Cited

U.S. PATENT DOCUMENTS

| | | | |
|---|---|---|---|
| 4,223,163 A | 9/1980 | Guilloty | 568/618 |
| 4,801,575 A | 1/1989 | Pardridge | |
| 5,099,074 A | 3/1992 | Mueller et al. | 568/617 |

(List continued on next page.)

FOREIGN PATENT DOCUMENTS

| | | | | |
|---|---|---|---|---|
| DE | 19632440 A1 | 2/1998 | ............ | B01J/31/26 |
| EP | 0822218 A2 | 2/1998 | ........... | C08G/77/46 |
| JP | 01207320 | 8/1989 | ........... | C08G/65/40 |
| WO | WO 97/14740 | 4/1997 | | |
| WO | WO 01/12230 | 2/2001 | | |

OTHER PUBLICATIONS

Xia et al, Effects of polyoxyethylene chain lengths of monodispersed polyethylene chain length distribution on the interfacial properties of polyethylene glycol n–dodecyl ether, Yingong Huaxue (1985), Chem Abstract 104: 150829.*

Coudert et al., "A Novel, Unequivocal Synthesis of Polyethylene Glycols," *Synthetic Communications*, 16(1): 19–26 (1986).

(List continued on next page.)

*Primary Examiner*—Duc Truong
(74) *Attorney, Agent, or Firm*—Moore & Van Allen, PLLC; William A. Barrett (57) ABSTRACT

Methods of synthesizing a substantially monodispersed mixture of polymers comprising polyethylene glycol moieties include:

reacting a substantially monodispersed mixture of compounds having the structure of Formula I:

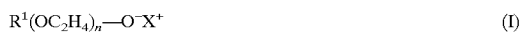

$R^1(OC_2H_4)_n$—$O^-X^+$ (I)

wherein $R^1$ is H or a lipophilic moiety; n is from 1 to 25; and $X^+$ is a positive ion, with a substantially monodispersed mixture of compounds having the structure of Formula II:

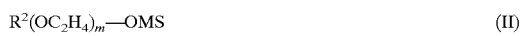

$R^2(OC_2H_4)_m$—OMS (II)

wherein $R^2$ is H or a lipophilic moiety; and m is from 1 to 25, under conditions sufficient to provide a substantially monodispersed mixture of polymers comprising polyethylene glycol moieties and having the structure of Formula III:

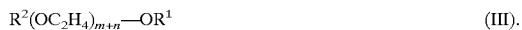

$R^2(OC_2H_4)_{m+n}$—$OR^1$ (III).

Substantially monodispersed mixtures of polymers comprising polyethylene glycol moieties are also disclosed.

37 Claims, 3 Drawing Sheets

U.S. PATENT DOCUMENTS

| | | |
|---|---|---|
| 5,122,614 A | 6/1992 | Zalipsky |
| 5,298,410 A | 3/1994 | Phillips et al. |
| 5,320,840 A | 6/1994 | Camble et al. |
| 5,428,128 A | 6/1995 | Mensi-Fattohi et al. |
| 5,468,478 A | 11/1995 | Saifer et al. |
| 5,567,422 A | 10/1996 | Greenwald |
| 5,612,460 A | 3/1997 | Zalipsky |
| 5,637,749 A | 6/1997 | Greenwald |
| 5,643,575 A | 7/1997 | Martinez et al. |
| 5,714,639 A | 2/1998 | Bowman et al. ............ 568/620 |
| 5,854,208 A | 12/1998 | Jones et al. |
| 6,011,008 A | 1/2000 | Domb et al. |

OTHER PUBLICATIONS

Y. Chen & G. Baker, "Synthesis and Properties of AMA Amphiphiles," *J. Org. Chem.*, 64: 6870–6873 (1999).

J. Milton Harris, "Laboratory Synthesis of Polyethylene Glycol Derivatives," *J. Macromol. Science—Rev. Macromol. Chem. Phys.*, C25(3): 325–373 (1985).

J. Xia & Z. Hu, "Effects of Polyoxyethylene Chain Length Distribution on the Interfacial Properties of Polyethylene Glycol N–Dodecyl Ether," *Yingyong Huaxue*, 2(4): 59–65 (1985) (Abstract).

Moghaddam, Amir, "Use of Polyethylene Glycol Polymers for Bioconjugations and Drug Development," American Biotechnology Laboratory, 19(8): 42–44 (Jul. 2001).

Francis, G.E., et al., *Polyethylene Glycol Modification: Relevance of Improved Methodology to Tumour Targeting*, Journal of Drug Targeting, vol. 3, pp. 321–340 (1996).

Guzman, Angel, et al., *Effects of Fatty Ethers and Stearic Acid of the Gastrointestinal Absorption of Insulin*, PRHSJ, vol. 9, No. 2, pp. 155–159 (Aug. 1990).

Krishnan, B. Radha, et al., *Stability and Physical Characteristics of Orally Active Amphiphilic Human Insulin Analog, Methoxy (Polyethylene Glycol) Hexanoyl Human Recombinant Insulin (HIM2)*, Proceed. Int'l. Symp. Control. Rel. Bioact. Mater., vol. 27 pp. 1038–1039 (2000).

Lindsay, D.G., et al., *The Acetylation of Insulin*, Biochem J., vol. 121, pp. 737–745 (1971).

Mesiha, M.S., et al., *Hypoglycaemic effect of oral insulin preparations containing Brij 35, 52, 58 or 92 and stearic acid*, J. Pharm. Pharmacol., vol. 33, pp. 733–734 (1981).

Neubauer, H. Paul, et al., *Influence of Polyethylene Glycol Insulin on Lipid Tissues of Experimental Animals*, Diabetes, vol. 32, pp. 953–958 (Oct. 1983).

Shen, Wei–Chiang, et al., (C) Means to Enhance Penetration; (3) Enhancement of polypeptide and protein absorption by macromolecular carriers via endocytosis and transcytosis, Advanced Drug Delivery Reviews, vol. 8, pp. 93–113 (1992).

Sirokman, Geza, et al., *Refolding and proton pumping activity of a polyethylene glycol–bacteriorhodopsin water–soluble conjugate*, Protein Science, vol. 2, pp. 1161–1170 (1993).

Torchilin, Vladimir P., *Immunoliposomes and PEGylated Immunoliposomes: Possible Use for Targeted Delivery of Imaging Agents*, Immunomethods, vol. 4, pp. 244–258 (1994).

Wei, Jiang, et al., *A Poly(Ethylene Glycol) Water–soluble Conjugate of Porin: Refolding to the Native State*, Biochemistry, vol. 34, pp. 6408–6415 (1995).

Zalipsky, Samuel, et al., *Peptide Attachment to Extremities of Liposomal Surface Grafted PEG Chains: Preparation of the Long–Circulating Form of Laminin Pentapeptide, YIGSR*, Bioconjugate Chem., vol. 6, pp. 705–708 (1995).

\* cited by examiner

SUBSTANTIALLY MONODISPERSED MIXTURES OF POLYMERS HAVING POLYETHYLENE GLYCOL MOIETIES

CROSS REFERENCE TO RELATED APPLICATIONS

This application is a continuation of U.S. application Ser. No. 09/873,731, filed Jun. 4, 2001 now abandoned, the disclosure of which is incorporated by reference herein in its entirety.

FIELD OF THE INVENTION

The present invention relates to methods of synthesizing polymeric compounds, and more particularly, to methods of synthesizing polymeric compounds comprising polyethylene glycol moieties.

BACKGROUND OF THE INVENTION

Polyethylene glycol (PEG) is used in a wide variety of applications including, but not limited to, plasticizers, softeners, humectants, ointments, polishes, paper coating, mold lubricants, bases for cosmetics and pharmaceuticals, solvents, binders, metal and rubber processing, and additives to foods and animal feed. Some particular uses of PEG in pharmaceutical applications include, for example, formation of PEG-drug conjugates, treatment of neonatal respiratory distress syndrome, treatment of functional and/or chronic constipation, treatment of encopresis in children, and diagnosis and therapy of gastrointestinal diseases.

PEG is typically produced by base-catalyzed ring-opening polymerization of ethylene oxide. The reaction is initiated by adding ethylene oxide to ethylene glycol, with potassium hydroxide as catalyst. This process results in a polydispersed mixture of polyethylene glycol polymers having a molecular weight within a given range of molecular weights. For example, PEG products offered by Sigma-Aldrich of Milwaukee, Wis. are provided in polydispersed mixtures such as PEG 400 ($M_n$ 380–420); PEG 1,000 ($M_n$ 950–1,050); PEG 1,500 ($M_n$ 1,400–1,600); and PEG 2,000 ($M_n$ 1,900–2,200).

In J. Milton Harris, *Laboratory Synthesis of polyethylene Glycol Derivatives*, 25(3) *Rev. Macromol. Chem. Phys.* 325–373 (1985), the author discusses synthesis of monomethyl ethers of PEG (also known as methyl-terminated PEG or mPEG). The reference states that mPEG contains a significant amount (as much as 25%; from size exclusion chromatography) of PEG without the methoxy end group. This PEG "impurity" may result from water present in the polymerization process. Under basic conditions, hydroxide is produced, which yields PEG upon reaction with the ethylene oxide monomer. Since the hydroxide-initiated PEG chain can grow at both ends, while the methoxide-initiated chain can grow from only one end, the resulting mixture has a broader molecular weight distribution than that for the PEG's.

While these polydispersed mixtures of PEGs and/or mPEGs may be useful for some applications, physical properties of polymers may vary with the length of the polymer. Thus, polydispersed mixtures may not be suitable for certain applications that require specific physical properties. Additionally, the heterogeneity of commercially available PEGs and mPEGs may complicate spectroscopic analysis, physico-chemical characterization and pharmacokinetics analysis. As a result, it is desirable to provide monodispersed mixtures of PEGs and/or mPEGs.

Monodispersed mixtures of PEG and/or mPEG polymers may be provided by various organic synthesis routes. For example, in Yiyan Chen & Gregory L. Baker, *Synthesis and Properties of ABA Amphiphiles*, 64 *J. Org. Chem.* 6870–6873 (1999), the authors propose the following scheme:

This synthesis route may be inconvenient due to the number of steps required as well as the use of undesirable reaction conditions such as high temperatures that may actually break down the PEG polymer. Moreover, it may be difficult to purify the product as the starting material may always be present in the reaction mixture.

In Gérard Coudert et al., *A Novel, Unequivocal Synthesis of Polyethylene Glycols*, Synthetic Communications, 16(1): 19–26 (1986), the authors proposed the following synthesis route:

This synthesis route may be inconvenient due to the undesirable reaction conditions, which do not lead to mPEG.

As a result, it is desirable to provide a new route for synthesizing PEG, mPEG, and/or polymers comprising a PEG moiety that are more efficient and do not require such undesirable reaction conditions.

SUMMARY OF THE INVENTION

Embodiments of the present invention provide improved methods for synthesizing substantially monodispersed mixtures of polymers comprising polyethylene glycol moieties. Methods according to embodiments of the present invention may utilize reaction conditions that are milder than those required by the conventional methods described above. For example, many, if not all, of the steps of methods according to embodiments of the present invention may be carried out at atmospheric pressure and/or at room temperature. The ability to perform these steps at atmospheric pressure and/or temperature may reduce or prevent the formation of undesirable side products. Additionally, methods according to embodiments of the present invention may be more efficient than the conventional methods described above. For example, methods according to embodiments of the present invention may require fewer steps and/or less time than the conventional methods described above. Methods according to embodiments of the present invention may provide the ability to remove PEG starting materials from the products comprising polyethylene glycol moieties to provide substantially monodispersed mixtures of polymers comprising polyethylene glycol moieties.

According to embodiments of the present invention, a method of synthesizing a substantially monodispersed mixture of polymers comprising polyethylene glycol moieties includes:

reacting a substantially monodispersed mixture of compounds having the structure of Formula I:

$$R^1(OC_2H_4)_n\text{—}O^-X^+ \quad (I)$$

wherein $R^1$ is H or a lipophilic moiety; n is from 1 to 25; and $X^+$ is a positive ion, with a substantially monodispersed mixture of compounds having the structure of Formula II:

$$R^2(OC_2H_4)_m\text{—}OMS \quad (II)$$

wherein $R^2$ is H or a lipophilic moiety; and m is from 1 to 25, under conditions sufficient to provide a substantially monodispersed mixture of polymers comprising polyethylene glycol moieties and having the structure of Formula III:

$$R^2(OC_2H_4)_{m+n}\text{—}OR^1 \quad (III).$$

Methods according to embodiments of the present invention may provide more efficient synthesis routes for substantially monodispersed mixtures of PEGs, substantially monodispersed mixtures of mPEGs and/or substantially monodispersed mixtures of polymers comprising PEG moieties. Methods of the present invention may reduce the number of steps and/or reduce the overall synthesis time compared to conventional methods of synthesizing PEG polymers. Methods of the present invention may also utilize milder reaction conditions than those used in conventional methods.

DETAILED DESCRIPTION OF PREFERRED EMBODIMENTS

The invention will now be described with respect to preferred embodiments described herein. It should be appreciated however that these embodiments are for the purpose of illustrating the invention, and are not to be construed as limiting the scope of the invention as defined by the claims.

As used herein, the term "non-polydispersed" is used to describe a mixture of compounds having a dispersity that is in contrast to the polydispersed mixtures of PEG products offered by Sigma-Aldrich of Milwaukee, Wis. such as PEG 400 ($M_n$ 380–420); PEG 1,000 ($M_n$ 950–1,050); PEG 1,500 ($M_n$ 1,400–1,600); and PEG 2,000 ($M_n$ 1,900–2,200).

As used herein, the term "substantially monodispersed" is used to describe a mixture of compounds wherein at least about 95 percent of the compounds in the mixture have the same molecular weight.

As used herein, the term "monodispersed" is used to describe a mixture of compounds wherein about 100 percent of the compounds in the mixture have the same molecular weight.

As used herein, the term "weight average molecular weight" is defined as the sum of the products of the weight fraction for a given molecule in the mixture times the mass of the molecule for each molecule in the mixture. The "weight average molecular weight" is represented by the symbol $M_w$.

As used herein, the term "number average molecular weight" is defined as the total weight of a mixture divided by the number of molecules in the mixture and is represented by the symbol $M_n$.

As used herein, the term "PEG" refers to straight or branched polyethylene glycol polymers, and includes the monomethylether of polyethylene glycol (mPEG). The terms "PEG subunit" and polyethylene glycol subunit refer to a single polyethylene glycol unit, i.e., —($CH_2CH_2O$)—.

As used herein, the term "lipophilic" means the ability to dissolve in lipids and/or the ability to penetrate, interact with and/or traverse biological membranes, and the term, "lipophilic moiety" or "lipophile" means a moiety which is lipophilic and/or which, when attached to another chemical entity, increases the lipophilicity of such chemical entity. Examples of lipophilic moieties include, but are not limited to, alkyls, fatty acids, esters of fatty acids, cholesteryl, adamantyl and the like.

As used herein, the term "lower alkyl" refers to substituted or unsubstituted alkyl moieties having from 1 to 5 carbon atoms.

As used herein, the term "higher alkyl" refers to substituted or unsubstituted alkyl moieties having 6 or more carbon atoms.

According to aspects of the present invention, a substantially monodispersed mixture of polymers comprising polyethylene glycol moieties is provided as illustrated in reaction 1:

$$R^1(OC_2H_4)_nO^-H^+ + R^2(OC_2H_4)_mOH \longrightarrow R^2(OC_2H_4)_{m+n}OR^1 \quad 1$$

$$(I) \qquad\qquad (II) \qquad\qquad (III)$$

$R^1$ is H or a lipophilic moiety. $R^1$ is preferably H, alkyl, aryl alkyl, an aromatic moiety, a fatty acid moiety, an ester of a fatty acid moiety, cholesteryl, or adamantyl. $R^1$ is more preferably H, lower alkyl, or an aromatic moiety. $R^1$ is most preferably H, methyl, or benzyl.

The value of n is from 1 to 25. Preferably n is from 1 to 6.

$X^+$ is a positive ion. Preferably $X^+$ is any positive ion in a compound, such as a strong base, that is capable of ionizing a hydroxyl moiety on PEG. Examples of positive ions include, but are not limited to, sodium ions, potassium ions, lithium ions, cesium ions, and thallium ions.

$R^2$ is H or a lipophilic moiety. $R^2$ is preferably branched or linear alkyl, aryl alkyl, an aromatic moiety, a fatty acid moiety, or an ester of a fatty acid moiety. $R^2$ is more preferably lower alkyl, benzyl, a fatty acid moiety having 1 to 24 carbon atoms, or an ester of a fatty acid moiety having 1 to 24 carbon atoms. $R^2$ is most preferably methyl, a fatty acid moiety having 1 to 18 carbon atoms or an ethyl ester of a fatty acid moiety having 1 to 18 carbon atoms.

The value of m is from 1 to 25. Preferably m is from 1 to 6.

Ms is a mesylate moiety (i.e., $CH_3S(O_2)$—).

As illustrated in reaction 1, a mixture of compounds having the structure of Formula I is reacted with a mixture of compounds having the structure of Formula II to provide a mixture of polymers comprising polyethylene glycol moieties and having the structure of Formula III. The mixture of compounds having the structure of Formula I is a substantially monodispersed mixture. Preferably, at least 96, 97, 98 or 99 percent of the compounds in the mixture of compounds of Formula I have the same molecular weight, and, more preferably, the mixture of compounds of Formula I is a monodispersed mixture. The mixture of compounds of Formula II is a substantially monodispersed mixture. Preferably, at least 96, 97, 98 or 99 percent of the compounds in the mixture of compounds of Formula II have the same molecular weight, and, more preferably, the mixture of compounds of Formula II is a monodispersed mixture. The mixture of compounds of Formula III is a substantially monodispersed mixture. Preferably, at least 96, 97, 98 or 99 percent of the compounds in the mixture of compound of Formula III have the same molecular weight. More preferably, the mixture of compounds of Formula III is a monodispersed mixture.

Reaction 1 is preferably performed between about 0° C. and about 40° C., is more preferably performed between about 15° C. and about 35° C., and is most preferably performed at room temperature (approximately 25° C.).

Reaction 1 may be performed for various periods of time as will be understood by those skilled in the art. Reaction 1 is preferably performed for a period of time between about 0.25, 0.5 or 0.75 hours and about 2, 4 or 8 hours.

Reaction 1 is preferably carried out in an aprotic solvent such as, but not limited to, N,N-dimethylacetamide (DMA), N,N-dimethylformamide (DMF), dimethyl sulfoxide, hexamethylphosphoric triamide, tetrahydrofuran (THF), dioxane, diethyl ether, methyl t-butyl ether (MTBE), toluene, benzene, hexane, pentane, N-methylpyrollidinone, tetrahydronaphthalene, decahydronaphthalene, 1,2-dichlorobenzene, 1,3-dimethyl-2-imidazolidinone, or a mixture thereof. More preferably, the solvent is DMF, DMA or toluene.

The molar ratio of the compound of Formula I to the compound of Formula II is preferably greater than about 1:1. More preferably, the molar ratio is at least about 2:1. By providing an excess of the compounds of Formula I, one can ensure that substantially all of the compounds of Formula II are reacted, which may aid in the recovery of the compounds of Formula III as discussed below.

Compounds of Formula I are preferably prepared as illustrated in reaction 2:

$R^1$ and $X^+$ are as described above and the mixture of compounds of Formula IV is substantially monodispersed;

preferably, at least 96, 97, 98 or 99 percent of the compounds in the mixture of compounds of Formula IV have the same molecular weight; and, more preferably, the mixture of compounds of Formula IV is a monodispersed mixture.

Various compounds capable of ionizing a hydroxyl moiety on the PEG moiety of the compound of Formula IV will be understood by those skilled in the art. The compound capable of ionizing a hydroxyl moiety is preferably a strong base. More preferably, the compound capable of ionizing a hydroxyl moiety is selected from the group consisting of sodium hydride, potassium hydride, sodium t-butoxide, potassium t-butoxide, butyl lithium (BuLi), and lithium disopropylamine. The compound capable of ionizing a hydroxyl moiety is more preferably sodium hydride.

The molar ratio of the compound capable of ionizing a hydroxyl moiety on the PEG moiety of the compound of Formula IV to the compound of Formula IV is preferably at least about 1:1, and is more preferably at least about 2:1. By providing an excess of the compound capable of ionizing the hydroxyl moiety, it is assured that substantially all of the compounds of Formula IV are reacted to provide the compounds of Formula I. Thus, separation difficulties, which may occur if both compounds of Formula IV and compounds of Formula I were present in the reaction product mixture, may be avoided.

Reaction 2 is preferably performed between about 0° C. and about 40° C., is more preferably performed between about 0° C. and about 35° C., and is most preferably performed between about 0° C. and room temperature (approximately 25° C.).

Reaction 2 may be performed for various periods of time as will be understood by those skilled in the art. Reaction 2 is preferably performed for a period of time between about 0.25, 0.5 or 0.75 hours and about 2, 4 or 8 hours.

Reaction 2 is preferably carried out in an aprotic solvent such as, but not limited to, N,N-dimethylacetamide (DMA), N,N-dimethylformamide (DMF), dimethyl sulfoxide, hexamethylphosphoric triamide, tetrahydrofuran (THF), dioxane, diethyl ether, methyl t-butyl ether (MTBE), toluene, benzene, hexane, pentane, N-methylpyrollidinone, dichloromethane, chloroform, tetrahydronaphthalene, decahydronaphthalene, 1,2-dichlorobenzene, 1,3-dimethyl-2-imidazolidinone, or a mixture thereof. More preferably, the solvent is DMF, dichloromethane or toluene.

Compounds of Formula II are preferably prepared as illustrated in reaction 3:

$R^2$ and Ms are as described above and the compound of Formula V is present as a substantially monodispersed mixture of compounds of Formula V; preferably at least 96, 97, 98 or 99 percent of the compounds in the mixture of compounds of Formula V have the same molecular weight; and, more preferably, the mixture of compounds of Formula V is a monodispersed mixture.

Q is a halide, preferably chloride or fluoride.

$CH_3S(O_2)Q$ is methanesulfonyl halide. The methanesulfonyl halide is preferably methanesulfonyl chloride or methanesulfonyl fluoride. More preferably, the methanesulfonyl halide is methanesulfonyl chloride.

The molar ratio of the methane sulfonyl halide to the compound of Formula V is preferably greater than about 1:1, and is more preferably at least about 2:1. By providing an excess of the methane sulfonyl halide, it is assured that substantially all of the compounds of Formula V are reacted to provide the compounds of Formula II. Thus, separation difficulties, which may occur if both compounds of Formula V and compounds of Formula II were present in the reaction product mixture, may be avoided.

Reaction 3 is preferably performed between about −10° C. and about 40° C., is more preferably performed between about 0° C. and about 35° C., and is most preferably performed between about 0° C. and room temperature (approximately 25° C.).

Reaction 3 may be performed for various periods of time as will be understood by those skilled in the art. Reaction 3 is preferably performed for a period of time between about 0.25, 0.5 or 0.75 hours and about 2, 4 or 8 hours.

Reaction 3 is preferably carried out in the presence of an aliphatic amine including, but not limited to, monomethylamine, dimethylamine, trimethylamine, monoethylamine, diethylamine, triethylamine, monoisopropylamine, diisopropylamine, mono-n-butylamine, di-n-butylamine, tri-n-butylamine, monocyclohexylamine, dicyclohexylamine, or mixtures thereof. More preferably, the aliphatic amine is a tertiary amine such as triethylamine.

As will be understood by those skilled in the art, various substantially monodispersed mixtures of compounds of Formula V are commercially available. For example, when $R^2$ is H or methyl, the compounds of Formula V are PEG or mPEG compounds, respectively, which are commercially available from Aldrich of Milwaukee, Wis.; Fluka of Switzerland, and/or TCl America of Portland, Oreg.

When $R^2$ is a lipophilic moiety such as, for example, higher alkyl, fatty acid, an ester of a fatty acid, cholesteryl, or adamantyl, the compounds of Formula V may be provided by various methods as will be understood by those skilled in the art. The compounds of Formula V are preferably provided as follows:

$R^2$ is a lipophilic moiety, preferably higher alkyl, fatty acid ester, cholesteryl, or adamantyl, more preferably a lower alkyl ester of a fatty acid, and most preferably an ethyl ester of a fatty acid having from 1 to 18 carbon atoms.

$R^3$ is H, benzyl, trityl, tetrahydropyran, or other alcohol protecting groups as will be understood by those skilled in the art.

$X_2^+$ is a positive ion as described above with respect to $X^+$.

The value of m is as described above.

Regarding reaction 4, a mixture of compounds of Formula VI is reacted with a mixture of compounds of Formula VII under reaction conditions similar to those described above with reference to reaction 1. The mixture of compounds of Formula VI is a substantially monodispersed mixture. Preferably, at least 96, 97, 98 or 99 percent of the compounds in the mixture of compounds of Formula VI have the same molecular weight. More preferably, the mixture of compounds of Formula VI is a monodispersed mixture. The mixture of compounds of Formula VII is a substantially monodispersed mixture. Preferably, at least 96, 97, 98 or 99 percent of the compounds in the mixture of compounds of Formula VII have the same molecular weight. More preferably, the mixture of compounds of Formula VII is a monodispersed mixture.

Regarding reaction 5, the compound of Formula VIII may be hydrolyzed to convert the $R^3$ moiety into an alcohol by various methods as will be understood by those skilled in the art. When $R^3$ is benzyl or trityl, the hydrolysis is preferably performed utilizing $H_2$ in the presence of a palladium-charcoal catalyst as is known by those skilled in the art. Of course, when $R^3$ is H, reaction 5 is unnecessary.

The compound of Formula VI may be commercially available or be provided as described above with reference to reaction 3. The compound of Formula VII may be provided as described above with reference to reaction 2.

Substantially monodispersed mixtures of polymers comprising PEG moieties and having the structure of Formula III above can further be reacted with other substantially monodispersed polymers comprising PEG moieties in order to extend the PEG chain. For example, the following scheme may be employed:

Ms, m and n are as described above with reference to reaction 1; p is similar to n and m, and $X_2^+$ is similar to $X^+$ as described above with reference to reaction 1. Q is as described above with reference to reaction 3. $R^2$ is as described above with reference to reaction 1 and is preferably lower alkyl. $R^1$ is H. Reaction 6 is preferably performed in a manner similar to that described above with reference to reaction 3. Reaction 7 is preferably performed in a manner similar to that described above with reference to reaction 1. Preferably, at least 96, 97, 98 or 99 percent of the compounds in the mixture of compounds of Formula III have the same molecular weight, and, more preferably, the mixture of compounds of Formula III is a monodispersed mixture. The mixture of compounds of Formula X is a substantially monodispersed mixture. Preferably, at least 96, 97, 98 or 99 percent of the compounds in the mixture of compounds of Formula X have the same molecular weight, and, more preferably, the mixture of compounds of Formula X is a monodispersed mixture.

An embodiment of a method according to the present invention is illustrated by the scheme shown in FIG. 1, which will now be described. The synthesis of a substantially monodispersed mixture of polyethylene glycol-containing oligomers begins by the preparation of the monobenzyl ether (XII) of a substantially monodispersed mixture of polyethylene glycol. An excess of a commercially available substantially monodispersed mixture of polyethylene glycol is reacted with benzyl chloride in the presence of aqueous sodium hydroxide as described by Coudert et al (Synthetic Communications, 16(1): 19–26 (1986)). The sodium salt of XII is then prepared by the addition of NaH, and this sodium salt is allowed to react with the mesylate synthesized from the ester of a hydroxyalkanoic acid (XIII). The product (XIV) of the displacement of the mesylate is debenzylated via catalytic hydrogenation to obtain the alcohol (XV). The mesylate (XVI) of this alcohol may be prepared by addition of methanesulfonyl chloride and used as the electrophile in the reaction with the sodium salt of the monomethyl ether of a substantially monodispersed mixture of a polyethylene glycol derivative, thereby extending the polyethylene glycol portion of the oligomer to the desired length, obtaining the elongated ester (XVII). The ester may be hydrolyzed to the acid (XVIII) in aqueous base and transformed into the activated ester (XIX) by reaction with a carbodiimide and N-hydroxysuccinimide. While the oligomer illustrated in FIG. 1 is activated using N-hydroxysuccinimide, it is to be understood that various other reagents may be used to activate oligomers of the present invention including, but not limited to, active phenyl chloroformates such as para-nitrophenyl chloroformate, phenyl chloroformate, 3,4-phenyldichloroformate, and 3,4-phenyldichloroformate; tresylation; and acetal formation.

Figure 1:
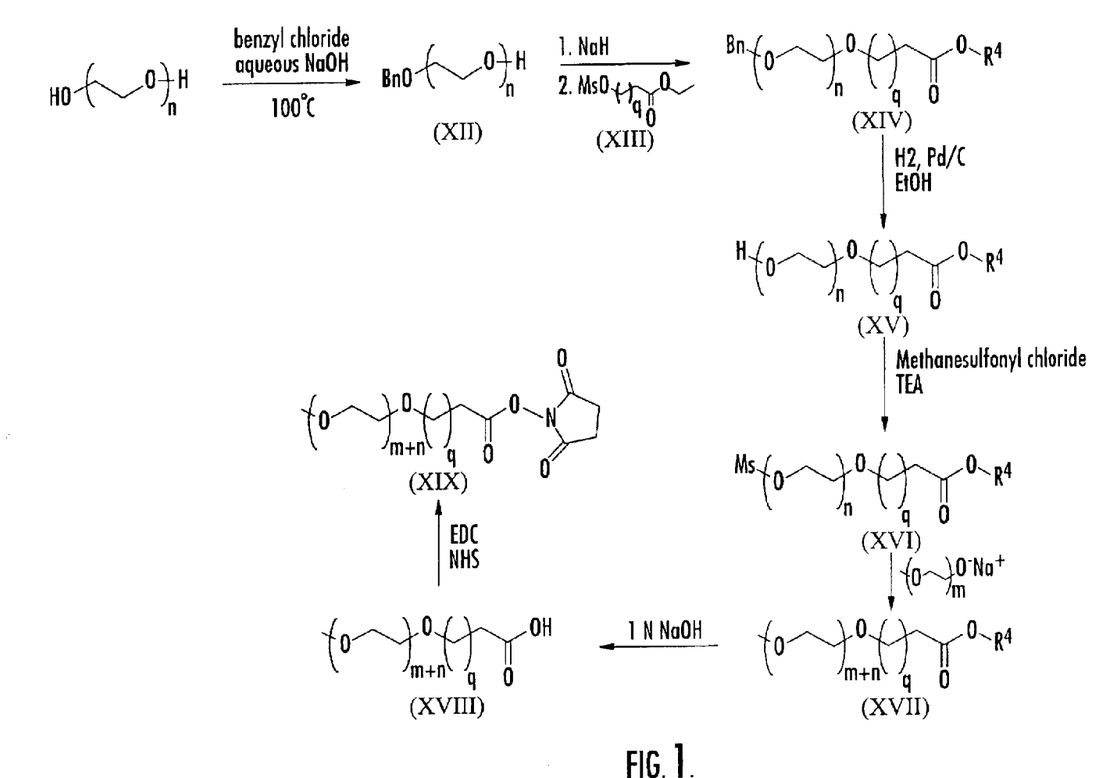
FIG. 1 illustrates a generic scheme for synthesizing a mixture of activated polymers comprising a polyethylene glycol moiety and a fatty acid moiety according to embodiments of the present invention.

Still referring to FIG. 1, q is from 1 to 24. Preferably, q is from 1 to 18, and q is more preferably from 4 to 16. $R^4$ is a moiety capable of undergoing hydrolysis to provide the carboxylic acid. $R^4$ is preferably lower alkyl and is more preferably ethyl. The variables n and m are as described above with reference to reaction 1.

All starting materials used in the procedures described herein are either commercially available or can be prepared by methods known in the art using commercially available starting materials.

The present invention will now be described with reference to the following examples. It should be appreciated that these examples are for the purposes of illustrating aspects of the present invention, and do not limit the scope of the invention as defined by the claims.

EXAMPLES

Figure 2:
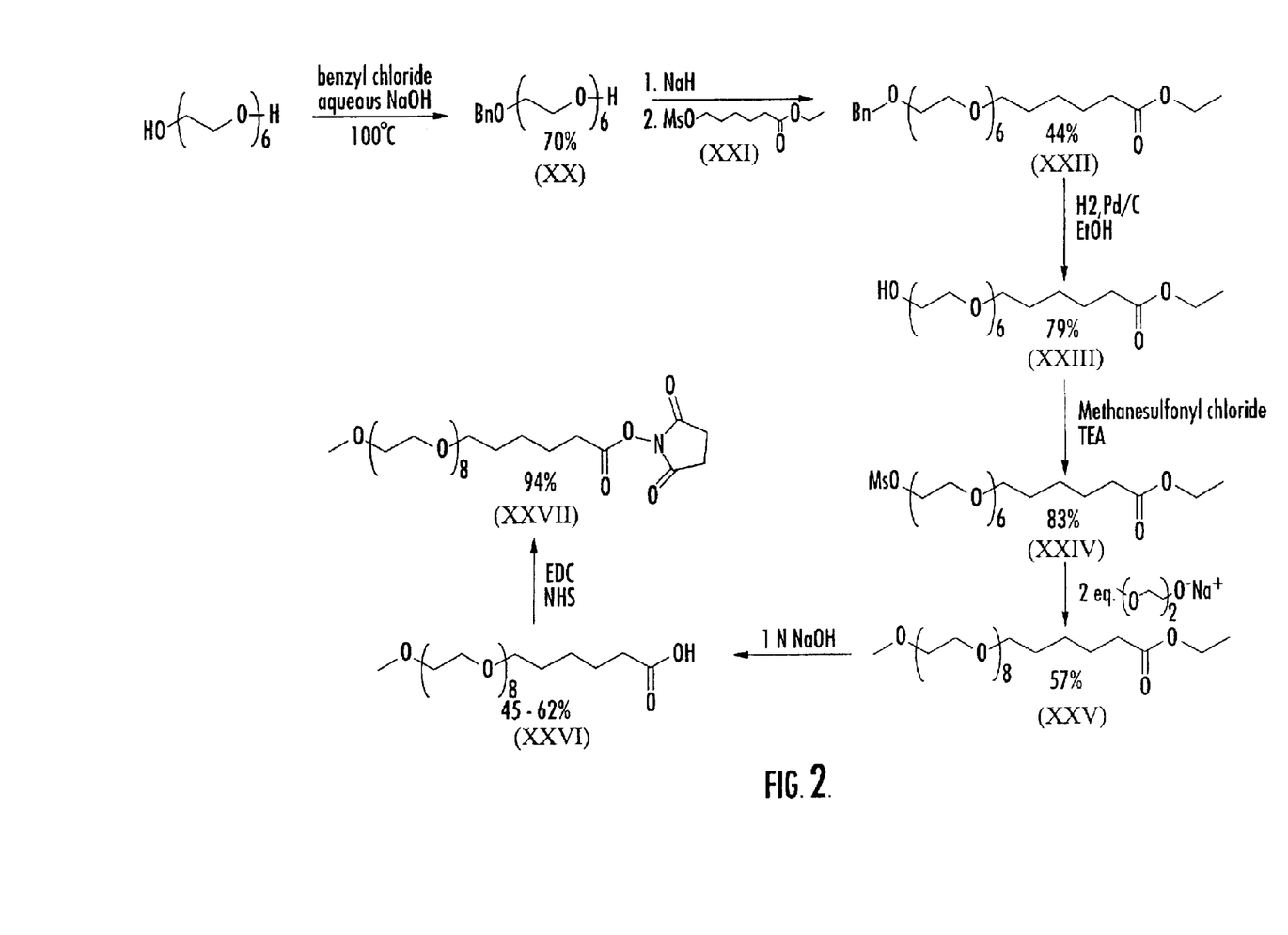
FIG. 2 illustrates a scheme for synthesizing a mixture of activated mPEG7-hexyl oligomers according to embodiments of the present invention.

Examples 1 through 6 refer to the scheme illustrated in FIG. 2.

Example 1

Hexaethylene Glycol Monobenzyl Ether (XX)

An aqueous sodium hydroxide solution prepared by dissolving 3.99 g (100 mmol) NaOH in 4 ml water was added slowly to non-polydispersed hexaethylene glycol (28.175 g, 25 ml, 100 mmol). Benzyl chloride (3.9 g, 30.8 mmol, 3.54 ml) was added and the reaction mixture was heated with stirring to 100° C. for 18 hours. The reaction mixture was then cooled, diluted with brine (250 ml) and extracted with methylene chloride (200 ml×2). The combined organic layers were washed with brine once, dried over $Na_2SO_4$, filtered and concentrated in vacuo to a dark brown oil. The crude product mixture was purified via flash chromatography (silica gel, gradient elution: ethyl acetate to 9/1 ethyl acetate/methanol) to yield 8.099 g (70%) of non-polydispersed XX as a yellow oil.

Example 2

Ethyl 6-methylsulfonyloxyhexanoate (XXI)

A solution of non-polydispersed ethyl 6-hydroxyhexanoate (50.76 ml, 50.41 g, 227 mmol) in dry dichloromethane (75 ml) was chilled in a ice bath and placed under a nitrogen atmosphere. Triethylamine (34.43 ml, 24.99 g, 247 mmol) was added. A solution of methanesulfonyl chloride (19.15 ml, 28.3 g, 247 mmol) in dry dichloromethane (75 ml) was added dropwise from an addition funnel. The mixture was stirred for three and one half hours, slowly being allowed to come to room temperature as the ice bath melted. The mixture was filtered through silica gel, and the filtrate was washed successively with water, saturated $NaHCO_3$, water and brine. The organics were dried over $Na_2SO_4$, filtered and concentrated in vacuo to a pale yellow oil. Final purification of the crude product was achieved by flash chromatography (silica gel, 1/1 hexanes/ethyl acetate) to give the non-polydispersed product (46.13 g, 85%) as a clear, colorless oil. FAB MS: m/e 239 (M+H), 193 (M—$C_2H_5O$).

Example 3

6-{2-[2-(2-{2-[2-(2-Benzyloxyethoxy)ethoxy]ethoxy}-ethoxy)-ethoxy]-ethoxy}-hexanoic Acid Ethyl Ester (XXII)

Sodium hydride (3.225 g or a 60% oil dispersion, 80.6 mmol) was suspended in 80 ml of anhydrous toluene, placed under a nitrogen atmosphere and cooled in an ice bath. A solution of the non-polydispersed alcohol XX (27.3 g, 73.3 mmol) in 80 ml dry toluene was added to the NaH suspension. The mixture was stirred at 0° C. for thirty minutes, allowed to come to room temperature and stirred for another five hours, during which time the mixture became a clear brown solution. The non-polydispersed mesylate XXI (19.21 g, 80.6 mmol) in 80 ml dry toluene was added to the NaH/alcohol mixture, and the combined solutions were stirred at room temperature for three days. The reaction mixture was quenched with 50 ml methanol and filtered through basic alumina. The filtrate was concentrated in vacuo and purified by flash chromatography (silica gel, gradient elution: 3/1 ethyl acetate/hexanes to ethyl acetate) to yield the non-polydispersed product as a pale yellow oil (16.52 g, 44%). FAB MS: m/e 515 (M+H).

Example 3

6-{2-[2-(2-{2-[2-(2-hydroxyethoxy)ethoxy]ethoxy}-ethoxy)-ethoxy]-ethoxy}-hexanoic Acid Ethyl Ester (XXIII)

Non-polydispersed benzyl ether XI (1.03 g, 2.0 mmol) was dissolved in 25 ml ethanol. To this solution was added 270 mg 10% Pd/C, and the mixture was placed under a hydrogen atmosphere and stirred for four hours, at which time TLC showed the complete disappearance of the starting material. The reaction mixture was filtered through Celite 545 to remove the catalyst, and the filtrate was concentrated in vacuo to yield the non-polydispersed title compound as a clear oil (0.67 g, 79%). FAB MS: m/e 425 (M+H), 447 (M+Na).

Example 4

6-{2-[2-(2-{2-[2-(2-methylsulfonylethoxy)ethoxy]ethoxy}-ethoxy)-ethoxy]-ethoxy}-hexanoic Acid Ethyl Ester (XXIV)

The non-polydispersed alcohol XXIII (0.835 g, 1.97 mmol) was dissolved in 3.5 ml dry dichloromethane and placed under a nitrogen atmosphere. Triethylamine (0.301 ml, 0.219 g, 2.16 mmol) was added and the mixture was chilled in an ice bath. After two minutes, the methanesulfonyl chloride (0.16 ml, 0.248 g, 2.16 mmol) was added. The mixture was stirred for 15 minutes at 0° C., then at room temperature for two hours. The reaction mixture was filtered through silica gel to remove the triethylammonium chloride, and the filtrate was washed successively with water, saturated NaHCO$_3$, water and brine. The organics were dried over Na$_2$SO$_4$, filtered and concentrated in vacuo. The residue was purified by column chromatography (silica gel, 9/1 ethyl acetate/methanol) to give non-polydispersed XXIV as a clear oil (0.819 g, 83%). FAB MS: m/e 503 (M+H).

Example 5

8-[2-(2-{2-[2-(2-{2-[2-(2-methoxyethoxy)ethoxy]-ethoxy}-ethoxy) -ethoxyl]-ethoxy}-ethoxy)-ethoxy]-hexanoic Acid Ethyl Ester (XXV)

NaH (88 mg of a 60% dispersion in oil, 2.2 mmol) was suspended in anhydrous toluene (3 ml) under N$_2$ and chilled to 0° C. Non-polydispersed diethylene glycol monomethyl ether (0.26 ml, 0.26 g, 2.2 mmol) that had been dried via azeotropic distillation with toluene was added. The reaction mixture was allowed to warm to room temperature and stirred for four hours, during which time the cloudy grey suspension became clear and yellow and then turned brown. Non-polydispersed mesylate XXIV (0.50 g, 1.0 mmol) in 2.5 ml dry toluene was added. After stirring at room temperature over night, the reaction was quenched by the addition of 2 ml of methanol and the resultant solution was filtered through silica gel. The filtrate was concentrated in vacuo and the FAB MS: m/e 499 (M+H), 521 (M+Na). Additional purification by preparatory chromatography (silica gel, 19/3 chloroform/methanol) provided the non-polydispersed product as a clear yellow oil (0.302 g 57%). FAB MS: m/e 527 (M+H), 549 (M+Na).

Example 6

8-[2-(2-{2-[2-(2-{2-[2-(2-methoxyethoxy)ethoxy]-ethoxy}-ethoxy) -ethoxy]-ethoxy}-ethoxy)-ethoxy]-hexanoic Acid (XXVI)

Non-polydispersed ester XXV (0.25 g, 0.46 mmol) was stirred for 18 hours in 0.71 ml of 1 N NaOH. After 18 hours, the mixture was concentrated in vacuo to remove the alcohol and the residue dissolved in a further 10 ml of water. The aqueous solution was acidified to pH 2 with 2 N HCl and the product was extracted into dichloromethane (30 ml×2). The combined organics were then washed with brine (25 ml×2), dried over Na$_2$SO$_4$, filtered and concentrated in vacuo to yield the non-polydispersed title compound as a yellow oil (0.147 g, 62%). FAB MS: m/e 499 (M+H), 521 (M+Na).

Example 7

8-[2-(2-{2-[2-(2-{2-[2-(2-methoxyethoxy)ethoxy]-ethoxy}-ethoxy)-ethoxy]-ethoxy}-ethoxy)-ethoxy]-hexanoic Acid 2,5-dioxo-pyrrolidin-1-yl Ester (XXVII)

Non-polydispersed acid XXVI (0.209 g, 0.42 mmol) were dissolved in 4 ml of dry dichloromethane and added to a dry flask already containing NHS (N-hydroxysuccinimide) (57.8 mg, 0.502 mmol) and EDC (1-(3-dimethylaminopropyl)-3-ethylcarbodiimide hydrochloride) (98.0 mg, 0.502 mmol) under a N$_2$ atmosphere. The solution was stirred at room temperature overnight and filtered through silica gel to remove excess reagents and the urea formed from the EDC. The filtrate was concentrated in vacuo to provide the non-polydispersed product as a dark yellow oil (0.235 g, 94%). FAB MS: m/e 596 (M+H), 618 (M+Na).

Examples 8 through 17

Figure 3:
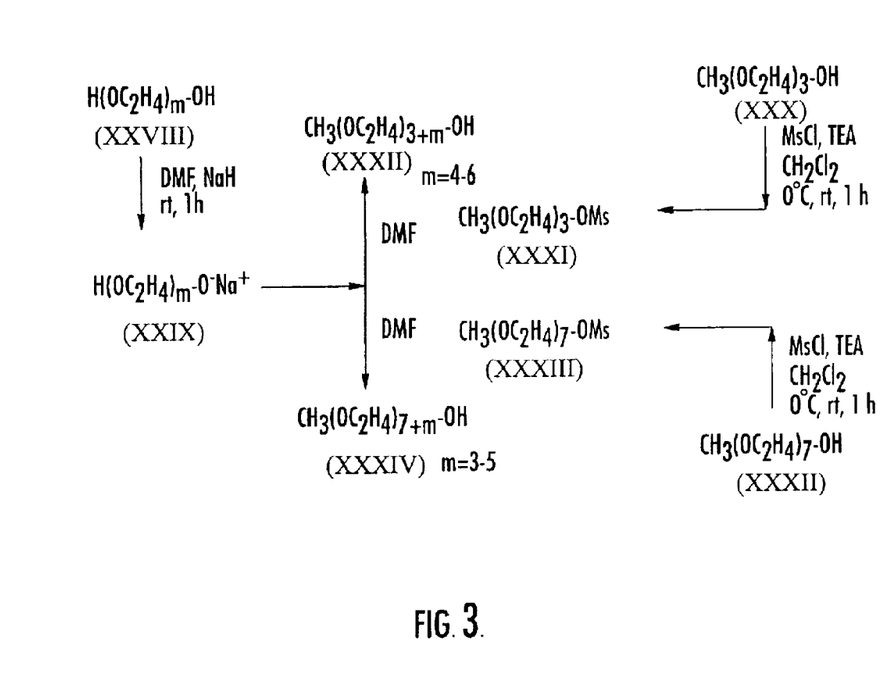
FIG. 3 illustrates a scheme for synthesizing a mixture of mPEG according to embodiments of the present invention.

Reactions in Examples 8 through 17 were carried out under nitrogen with magnetic stirring, unless otherwise specified. "Work-up" denotes extraction with an organic solvent, washing of the organic phase with saturated NaCl solution, drying (MgSO$_4$), and evaporation (rotary evaporator). Thin layer chromatography was conducted with Merck glass plates precoated with silica gel 60° F.-254 and spots were visualized by iodine vapor. All mass spectra were determined by Macromolecular Resources Colorado State University, CO and are reported in the order m/z, (relative intensity). Elemental analyses and melting points were performed by Galbraith Laboratories, Inc., Knoxville, Tenn. Examples 8–17 refer to the scheme illustrated in FIG. 3.

Example 8

8-Methoxy-1-(methylsulfonyl)oxy-3,6-dioxaoctane (XXXI)

A solution of non-polydispersed triethylene glycol monomethyl ether molecules (4.00 mL, 4.19 g, 25.5 mmol) and triethylamine (4.26 mL, 3.09 g, 30.6 mmol) in dry dichloromethane (50 mL) was chilled in an ice bath and place under a nitrogen atmosphere. A solution of methanesulfonyl chloride (2.37 mL, 3.51 g, 30.6 mmol) in dry dichloromethane (20 mL) was added dropwise from an addition funnel. Ten minutes after the completion of the chloride addition, the reaction mixture was removed from the ice bath and allowed to come to room temperature. The mixture was stirred for an additional hour, at which time TLC (CHCl$_3$ with 15% MeOH as the elutant) showed no remaining triethylene glycol monomethyl ether.

The reaction mixture was diluted with another 75 mL of dichloromethane and washed successively with saturated NaHCO$_3$, water and brine. The organics were dried over Na$_2$SO$_4$, filtered and concentrated in vacuo to give non-polydispersed compound XXXI as a clear oil (5.31 g, 86%).

Example 9

Ethylene Glycol Mono Methyl Ether (XXXII) (m= 4,5,6)

To a stirred solution of non-polydispersed compound XXVIII (35.7 mmol) in dry DMF (25.7 mL), under N$_2$ was added in portion a 60% dispersion of NaH in mineral oil, and the mixture was stirred at room temperature for 1 hour. To this salt XXIX was added a solution of non-polydispersed mesylate XXXI (23.36) in dry DMF (4 ml) in a single portion, and the mixture was stirred at room temperature for 3.5 hours. Progress of the reaction was monitored by TLC (12% CH$_3$OH—CHCl$_3$). The reaction mixture was diluted with an equal amount of 1N HCl, and extracted with ethyl acetate (2×20 ml) and discarded. Extraction of aqueous solution and work-up gave non-polydispersed polymer XXXII (82–84% yield).

Example 10

3,6,9,12,15,18,21-Heptaoxadocosanol (XXXII) (m= 4)

Oil; Rf 0.46 (methanol:chloroform=3:22); MS m/z calc'd for C$_{15}$H$_{32}$O$_8$ 340.21 (M$^+$+1), found 341.2.

Example 11

3,6,9,12,15,18,21,24-Octaoxapentacosanol (XXXII) (m=5)

Oil; Rf 0.43 (methanol:chloroform=6:10); MS m/z calc'd for C$_{17}$H$_{36}$O$_9$ 384.24 (M$^+$+1), found 385.3.

Example 12

3,6,9,12,15,18,21,24,27-Nonaoxaoctacosanol (XXXII) (m=5)

Oil; Rf 0.42 (methanol:chloroform=6:10); MS m/z calc'd for $C_{19}H_{40}O_{10}$ 428.26 ($M^++1$), found 429.3.

Example 13

20-methoxy-1-(methylsulfonyl)oxy-3,6,9,12,15,18-hexaoxaeicosane (XXXIII)

Non-polydispersed compound XXXIII was obtained in quantitative yield from the alcohol XXXII (m=4) and methanesulfonyl chloride as described for XXXI, as an oil; Rf 0.4 (ethyl acetate:acetonitrile=1:5); MS m/z calc'd for $C_{17}H_{37}O_{10}$ 433.21 ($M^++1$), found 433.469.

Example 14

Ethylene Glycol Mono Methyl Ether (XXXIV) (m=3,4,5)

The non-polydispersed compounds XXXIV were prepared from a diol by using the procedure described above for compound XXXII.

Example 15

3,6,9,12,15,18,21,24,27,30-Decaoxaheneicosanol (XXXIV) (m=3)

Oil; Rf 0.41 (methanol:chloroform=6:10); MS m/z calc'd for $C_{21}H_{44}O_{11}$ 472.29 ($M^++1$), found 472.29.

Example 16

3,6,9,12,15,18,21,24,27,30,33-Unecaoxatetratricosanol (XXXIV) (m=4)

Oil; Rf 0.41 (methanol:chloroform=6:10); MS m/z calc'd for $C_{23}H_{48}O_{12}$ 516.31 ($M^++1$), found 516.31.

Example 17

3,6,9,12,15,18,21,24,27,30,33,36-Dodecaoxaheptatricosanol (XXXIV) (m=5)

Oil; Rf 0.41 (methanol:chloroform=6:10); MS m/z calc'd for $C_{25}H_{52}O_{13}$ 560.67 ($M^++1$), found 560.67.

In the specification, there has been disclosed typical preferred embodiments of the invention and, although specific terms are employed, they are used in a generic and descriptive sense only and not for purposes of limitation, the scope of the invention being set forth in the following claims.

What is claimed is:

1. A substantially monodispersed mixture of polymers, wherein at least 95 percent of the polymers in the mixture each comprise a polyethylene glycol moiety having from 7 to 50 polyethylene glycol subunits, and wherein the at least 95 percent of the polymers in the mixture each have the same number of polyethylene glycol subunits.

2. The mixture of polymers of claim 1, wherein at least 96 percent of the polymers in the mixture have the same molecular weight, wherein the at least 96 percent of the polymers in the mixture each comprise a polyethylene glycol moiety having from 7 to 50 polyethylene glycol subunits, and wherein the at least 96 percent of the polymers in the mixture each have the same number of polyethylene glycol subunits.

3. The mixture of polymers of claim 1, wherein at least 97 percent of the polymers in the mixture have the same molecular weight, wherein the at least 97 percent of the polymers in the mixture each comprise a polyethylene glycol moiety having from 7 to 50 polyethylene glycol subunits, and wherein the at least 97 percent of the polymers in the mixture each have the same number of polyethylene glycol subunits.

4. The mixture of polymers of claim 1, wherein at least 98 percent of the polymers in the mixture have the same molecular weight, wherein the at least 98 percent of the polymers in the mixture each comprise a polyethylene glycol moiety having from 7 to 50 polyethylene glycol subunits, and wherein the at least 98 percent of the polymers in the mixture each have the same number of polyethylene glycol subunits.

5. The mixture of polymers of claim 1, wherein at least 99 percent of the polymers in the mixture have the same molecular weight, wherein the at least 99 percent of the polymers in the mixture each comprise a polyethylene glycol moiety having from 7 to 50 polyethylene glycol subunits, and wherein the at least 99 percent of the polymers in the mixture each have the same number of polyethylene glycol subunits.

6. The mixture of polymers of claim 1, wherein the at least 95 percent of the polymers in the mixture each further comprise an ester of a fatty acid moiety covalently coupled to the polyethylene glycol moiety.

7. The mixture of polymers of claim 6, wherein the fatty acid moiety has from 1 to 24 carbon atoms.

8. The mixture of polymers of claim 6, wherein the fatty acid moiety has from 1 to 18 carbon atoms.

9. The mixture of polymers of claim 6, wherein the fatty acid moiety has from 3 to 20 carbon atoms.

10. The mixture of polymers of claim 6, wherein the fatty acid moiety has from 6 to 18 carbon atoms.

11. The mixture of polymers of claim 6, wherein the ester is a lower alkyl ester.

12. The mixture of polymers of claim 6, wherein the ester is an ethyl ester.

13. The mixture of polymers of claim 6, wherein the at least 95 percent of the polymers in the mixture each further comprise a benzyl moiety covalently coupled to the polyethylene glycol moiety.

14. The mixture of polymers of claim 1, wherein the at least 95 percent of the polymers in the mixture each further comprise a fatty acid moiety coupled to the polyethylene glycol moiety.

15. The mixture of polymers of claim 14, wherein the fatty acid moiety has from 1 to 24 carbon atoms.

16. The mixture of polymers of claim 14, wherein the fatty acid moiety has from 1 to 18 carbon atoms.

17. The mixture of polymers of claim 14, wherein the fatty acid moiety has from 3 to 20 carbon atoms.

18. The mixture of polymers of claim 14, wherein the fatty acid moiety has from 6 to 18 carbon atoms.

19. The mixture of polymers of claim 14, wherein the at least 95 percent of the polymers in the mixture are activated polymers.

20. The mixture of polymers of claim 19, wherein the activated polymers each comprise an activating moiety selected from the group consisting of an N-hydroxysuccinimide moiety, an active phenyl chloroformate moiety, a tresylate moiety, and an acetal moiety.

21. The mixture of polymers of claim 1, wherein the at least 95 percent of the polymers in the mixture each further comprise an alkyl moiety coupled to the polyethylene glycol moiety.

22. The mixture of polymers of claim 21, wherein the alkyl moiety is a lower alkyl moiety.

23. The mixture of polymers of claim 21, wherein the at least 95 percent of the polymers in the mixture each further comprise a lipophilic moiety.

24. A substantially monodispersed mixture of polymers, wherein at least 95 percent of the polymers in the mixture each comprise a fatty acid moiety covalently coupled to a polyethylene glycol moiety having from 7 to 50 polyethylene glycol subunits, and wherein the at least 95 percent of the polymers in the mixture each have the same number of polyethylene glycol subunits.

25. The mixture of polymers of claim 24, wherein at least 96 percent of the polymers in the mixture have the same molecular weight, wherein the at least 96 percent of the polymers in the mixture each comprise a fatty acid moiety covalently coupled to a polyethylene glycol moiety having from 7 to 50 polyethylene glycol subunits, and wherein the at least 96 percent of the polymers in the mixture each have the same number of polyethylene glycol subunits.

26. The mixture of polymers of claim 24, wherein at least 97 percent of the polymers in the mixture have the same molecular weight, wherein the at least 97 percent of the polymers in the mixture each comprise a fatty acid moiety covalently coupled to a polyethylene glycol moiety having from 7 to 50 polyethylene glycol subunits, and wherein the at least 97 percent of the polymers in the mixture each have the same number of polyethylene glycol subunits.

27. The mixture of polymers of claim 24, wherein at least 98 percent of the polymers in the mixture have the same molecular weight, wherein the at least 98 percent of the polymers in the mixture each comprise a fatty acid moiety covalently coupled to a polyethylene glycol moiety having from 7 to 50 polyethylene glycol subunits, and wherein the at least 98 percent of the polymers in the mixture each have the same number of polyethylene glycol subunits.

28. The mixture of polymers of claim 24, wherein at least 99 percent of the polymers in the mixture have the same molecular weight, wherein the at least 99 percent of the polymers in the mixture each comprise a fatty acid moiety covalently coupled to a polyethylene glycol moiety having from 7 to 50 polyethylene glycol subunits, and wherein the at least 99 percent of the polymers in the mixture each have the same number of polyethylene glycol subunits.

29. The mixture of polymers of claim 24, wherein the fatty acid moiety has from 1 to 24 carbon atoms.

30. The mixture of polymers of claim 24, wherein the fatty acid moiety has from 1 to 18 carbon atoms.

31. The mixture of polymers of claim 24, wherein the fatty acid moiety has from 3 to 20 carbon atoms.

32. The mixture of polymers of claim 24, wherein the fatty acid moiety has from 6 to 18 carbon atoms.

33. A substantially monodispersed mixture of polymers, wherein at least 95 percent of the polymers in the mixture each consist of a polyethylene glycol moiety having from 7 to 50 polyethylene glycol subunits and a terminal methyl group at one end of the polyethylene glycol moiety, and wherein the at least 95 percent of the polymers in the mixture each have the same number of polyethylene glycol subunits.

34. The mixture of polymers of claim 33, wherein at least 96 percent of the polymers in the mixture have the same molecular weight, wherein the at least 96 percent of the polymers in the mixture each consist of a polyethylene glycol moiety having from 7 to 50 polyethylene glycol subunits and a terminal methyl group at one end of the polyethylene glycol moiety, and wherein the at least 96 percent of the polymers in the mixture each have the same number of polyethylene glycol subunits.

35. The mixture of polymers of claim 33, wherein at least 97 percent of the polymers in the mixture have the same molecular weight, wherein the at least 97 percent of the polymers in the mixture each consist of a polyethylene glycol moiety having from 7 to 50 polyethylene glycol subunits and a terminal methyl group at one end of the polyethylene glycol moiety, and wherein the at least 97 percent of the polymers in the mixture each have the same number of polyethylene glycol subunits.

36. The mixture of polymers of claim 33, wherein at least 98 percent of the polymers in the mixture have the same molecular weight, wherein the at least 98 percent of the polymers in the mixture each consist of a polyethylene glycol moiety having from 7 to 50 polyethylene glycol subunits and a terminal methyl group at one end of the polyethylene glycol moiety, and wherein the at least 98 percent of the polymers in the mixture each have the same number of polyethylene glycol subunits.

37. The mixture of polymers of claim 33, wherein at least 99 percent of the polymers in the mixture have the same molecular weight, wherein at least 99 percent of the polymers in the mixture each consist of a polyethylene glycol moiety having from 7 to 50 polyethylene glycol subunits and a terminal methyl group at one end of the polyethylene glycol moiety, and wherein the at least 99 percent of the polymers in the mixture each have the same number of polyethylene glycol subunits.

* * * * *